(12) United States Patent
Kim et al.

(10) Patent No.: US 8,338,546 B2
(45) Date of Patent: Dec. 25, 2012

(54) COMPOSITION OF POLYTHIOPHENE-BASED CONDUCTIVE POLYMERS HAVING HIGH CONDUCTIVITY, TRANSPARENCY, WATERPROOF PROPERTY AND A MEMBRANE PREPARED USING THE SAME

(75) Inventors: Jin Hwan Kim, Suwon-si (KR); Dae Gi Ryu, Yongin-si (KR); Yong Lae Yi, Anyang-si (KR); Jong Ho Park, Suwon-si (KR)

(73) Assignee: SKC Co., Ltd., Gyeonggi-do (KR)

( * ) Notice: Subject to any disclaimer, the term of this patent is extended or adjusted under 35 U.S.C. 154(b) by 676 days.

(21) Appl. No.: 12/160,551

(22) PCT Filed: Feb. 21, 2007

(86) PCT No.: PCT/KR2007/000891
§ 371 (c)(1),
(2), (4) Date: Jul. 10, 2008

(87) PCT Pub. No.: WO2007/097564
PCT Pub. Date: Aug. 30, 2007

(65) Prior Publication Data
US 2008/0293855 A1   Nov. 27, 2008

(30) Foreign Application Priority Data

Feb. 21, 2006 (KR) .......... 10-2006-0016893
Feb. 21, 2007 (KR) .......... 10-2007-0017205

(51) Int. Cl.
*C08G 12/32* (2006.01)
*C08K 5/1515* (2006.01)
*C08K 5/053* (2006.01)

(52) U.S. Cl. ......... 525/535; 524/114; 524/386; 524/417

(58) Field of Classification Search .......... None
See application file for complete search history.

(56) References Cited

U.S. PATENT DOCUMENTS

| | | | |
|---|---|---|---|
| 4,948,690 A * | 8/1990 | Hisamura et al. | 430/60 |
| 5,035,926 A | 7/1991 | Jonas et al. | |
| 5,391,472 A | 2/1995 | Muys et al. | |
| 5,658,702 A * | 8/1997 | Nukada | 430/62 |
| 6,235,827 B1 | 5/2001 | Kim et al. | |
| 6,248,818 B1 | 6/2001 | Kim et al. | |
| 7,029,811 B2 * | 4/2006 | Azuma et al. | 430/69 |
| 2002/0142094 A1 * | 10/2002 | Fukushima et al. | 427/214 |

FOREIGN PATENT DOCUMENTS

| | | |
|---|---|---|
| KR | 10-2000-0001824 | 1/2000 |
| KR | 10-2000-0010221 | 2/2000 |
| KR | 10-2005-0066209 | 6/2005 |

* cited by examiner

*Primary Examiner* — John J Figueroa
(74) *Attorney, Agent, or Firm* — Frommer Lawrence & Haug LLP; Ronald R. Santucci

(57) ABSTRACT

The present invention relates to a polythiophene-based conductive polymer composition having high conductivity, transparency, waterproof property and durability, and a polymer membrane prepared by using the same. In particular, the present invention relates to a polythiophene-based conductive polymer composition comprising an aqueous solution of a polythiophene-based conductive polymer, an alcohol-based organic solvent, an amide-based organic solvent or an aprotic highly-dipolar solvent, a melamine resin and a binder selected among a polyester, a polyurethane resin and an alkoxy silane in a predetermined mixed ratio. The membrane prepared using the same has a high conductivity of less than 1 kΩ/m2 and a high transparency of higher than 95%, thus being applicable to of an anti-static film, a film for touch panel, a film for higher or lower electrode, a film for inorganic EL and a film for display electrode.

12 Claims, No Drawings

COMPOSITION OF POLYTHIOPHENE-BASED CONDUCTIVE POLYMERS HAVING HIGH CONDUCTIVITY, TRANSPARENCY, WATERPROOF PROPERTY AND A MEMBRANE PREPARED USING THE SAME

This application is a 371 of PCT/KR2007/000891 filed on Feb. 21, 2007, published on Aug. 30, 2007 under publication number WO 2007/097564 A1 which claims priority benefits from South Korean Patent Application Number 10-2006-0016893 filed Feb. 21, 2006 and South Korean Patent Application Number 10-2007-0017205 filed Feb. 21, 2007, the disclosures of each are hereby incorporated by reference.

RELATED ART

Polyaniline (PAN), polypyrrole (PPy) and polythiophene (PT) are widely used as a conductive polymer. Extensive researches have been conducted on these polymers because they are easily polymerized and have superior conductivity, thermal stability and oxidation stability.

Due to their electrical property, these conductive polymers have been suggested for their use as an electrode of a second battery, materials for preventing electromagnetic waves, flexible electrodes, anti-static materials, anti-corrosion coating materials, etc. However, they have not been yet commercialized due to the difficulty in process, as well as poor thermal stability, weatherability, waterproof property and high cost. However, these conductive polymers have recently drawn much attention due to their potential as a coating material for preventing electromagnetic waves together with anti-dust and anti-static coating materials because of the tightly revised standards regarding prevention of electromagnetic.

In particular, the conductive polymers have recently begun to draw attention for their use as a conductive coating material for the glass surface of Braun tube since polyethylene dioxythiophene (PEDT), i.e., polythiophene-based conductive polymer, was disclosed in U.S. Pat. Nos. 5,035,926 and 5,391,472. This conductive polymer has a superior transparency to polyaniline-based, polypyrrole-based and polythiophene-based other conductive polymers.

For the preparation of the conventional polyethylene dioxythiophene, polymeric acid salt such as polystyrene sulfonate is used as a doping material to increase conductivity, and a coating solution, which may be subject to an aqueous dispersion, was prepared. This has a superior miscibility with alcohol solvent and a superior processibility and may be applicable to various coating materials for a Braun tube (CRT) or plastic film surface.

A representative example of this polyethylene dioxythiophene is Baytron P (V4, 500 grade) of Bayer Company. However, the polyethylene dioxythiophene conductive polymer needs to be coated with a low concentration polyethylene dioxythiophene for achieving a transparency of higher than 95%. Thus, a conductivity of less than 1 k$\Omega$/m$^2$ is difficult to achieve according to a conventional method. Further, a non-conductive silica sol prepared from alkoxy silane [RSi(OR$_1$)$_3$], wherein R is a methyl, ethyl, propyl or isopropyl group, and R$_1$ is a methyl or ethyl group), may further decrease the conductivity when it is added to increase the adhesiveness of a membrane, which makes it more difficult to prepare a membrane with high conductivity of less than 1 k$\Omega$/m$^2$. For the above reason, the polymer has been used only as an anti-static coating material requiring a relatively low conductivity. Further, Baytron P of Bayer Company is an aqueous dispersion, and is vulnerable to water due to the intramolecular SO$_3^-$ group even after the formation of a polymer membrane. Thus, a polymer membrane prepared by using Baytron P shows a drastic change in electrical property when left for a long period of time or exposed to environment of high humidity, thus hindering commercialization.

In this regard, Korean patent publication No. 2000-10221 discloses a conductive polymer composition comprising polyethylene dioxythiophene, alcohol-based solvent, amide solvent, a polyester-based resin binder. Korean patent publication No. 2005-66209 discloses composition for coating highly diffusive conductive film, which comprises polyethylene dioxythiophene, alcohol-based solvent, amide solvent and silane coupling agents.

Although the aforementioned arts disclose compositions having high transparency, adhesiveness and durability as well as electrical property of less than 1 k$\Omega$/m$^2$, the time-dependent conductive polymer membranes show drastic change in electrical property, especially at a condition of high temperature and high humidity, thus hindering their commercialization. Despite the transparency of higher than 95%, it has been almost impossible to achieve high waterproof property, adhesiveness and durability as well as surface resistance of lower than 1 k$\Omega$/m$^2$, the standards required for the prevention of electromagnetic waves (TCO standard), due to the aforementioned drawbacks. It has also not been possible to apply the conductive membrane to films to a personal digital assistants (PDA), touch panels or inorganic EL electrodes and transparent electrode films.

Thus, the present inventors conducted extensive researches polythiophene-based conductive polymer having high conductivity as well as other high properties such as transparency, waterproof property and durability. As a result, the present invention was finally completed based on the findings that a polymer composition, which comprises an aqueous solution of a polythiophene-based conductive polymer, an alcohol-based organic solvent, an amide-based organic solvent or an aprotic highly-dipolar solvent, a melamine resin, and a binder selected from the group consisting of a polyester, a polyurethane and an alkoxy silane, may increase both conductivity and transparency as well as other properties such as waterproof property, adhesiveness, durability, membrane Homogeneity and liquid stability without using the conventional stabilizer. This is due to the fact that an amide-based organic solvent or an aprotic highly-dipolar solvent dissolves the polymer portion of an aqueous solution of a polythiophene-based conductive polymer, thus increasing the connection between polythiophene-based conductive polymers and dispersion property, and that the NH$^+$ group in a melamine resin binds with the SO$_3^-$ group in an aqueous solution of a polythiophene-based conductive polymer (Baytron P) by preventing the SO$_3^-$ group from binding with water, thus increasing waterproof property and time-dependent electrical stability as well as adhesiveness between a binder with a transparent substrate and durability of a conductive membrane.

Therefore, an objective of the present invention is to provide a polythiophene-based conductive polymer composition that exhibits improved conductivity and transparency as well as other highly improved properties such as waterproof property, adhesiveness, durability, membrane Homogeneity and liquid stability, together with a polymer membrane prepared by using a composition herein.

EXAMPLES

The present invention is described more specifically by the following Examples. Examples herein are meant only to illustrate the present invention, and they should not be construed as limiting the scope of the present invention.

Examples 1-3 and Comparative Examples 1-6

Amide-Based Organic Solvent

The utilized ingredients and the amounts are presented in Table 1. PEDT conductive polymer aqueous solution was vigorously agitated and then added with an alcohol solvent, an amide-based organic solvent, a melamine resin, a binder, a stabilizer and a slip and a viscosity reducing agent in this order at intervals of about 7 minutes. The mixture was stirred for about 4 hours to become homogenized and a solution composition was obtained therefrom.

The mixed solution composition was coated onto a transparent substrate, and dried in an oven (125° C.) for about 5 minutes to produce a polythiophene polymer membrane. The thickness of the dried membrane was less than 5 μm. The properties of thus prepared polythiophene polymer membrane were measured as described below, and the results are presented in Table 2.

(1) Conductivity was obtained by measuring surface resistance using an ohm meter (Mitsubishi Chemical, Loresta EP MCP-T360)
(2) Transparency was evaluated at 550 nm. Transparency of a coated substrate was represented in the form considering the transparency of a transparent substrate as 100% (Minolta, CM-3500d)
(3) Adhesiveness was obtained by evaluating the change in surface resistance after taping ten times with a taping tester (tape was purchased from Nitto).
  <Resistance Change>
  ① less than 50 $\Omega/m^2$: Good
  ② 50-100 $\Omega/m^2$: Average
  ③ higher than 100 $\Omega/m^2$: Poor
(4) Waterproof property was obtained by evaluating the change in surface resistance after the storage at constant temperature and humidity (60° C., 90%, 10 days).
  <Resistance Change>
  ① less than 50 $\Omega/m^2$: Good
  ② 50-100 $\Omega/m^2$: Average
  ③ higher than 100 $\Omega/m^2$: Poor

TABLE 1

| Content (g) | PEDT aqueous solution | Alcohol | Amide-based solvent | Stabilizer | Melamine resin | Binder Polyester/ urethane/ alkoxy silane |
|---|---|---|---|---|---|---|
| Ex. 1 | 46.2 | MeOH (48.8) | FA (2) NMP (1) | — | Melamine (1) | PET(aq) (1) |
| Ex. 2 | 46.2 | MeOH (46.8) | FA (2) NMP (1) | — | Melamine (3) | A-187 (1) |
| Ex. 3 | 46.2 | MeOH (45.8) | FA (2) NMP (1) | — | Melamine (5) | — |
| Comp. Ex. 1 | 46.2 | MeOH (49.8) | FA (2) NMP (1) | — | — | A-187 (1) |
| Comp. Ex. 2 | 46.2 | MeOH (48.8) | FA (2) NMP (1) | — | — | PET(aq) (2) |
| Comp. Ex. 3 | 46.2 | MeOH (45.8) | FA (2) NMP (1) | p-TSA (5) | — | — |
| Comp. Ex. 4 | 46.2 | MeOH (41.8) | FA (2) NMP (1) | p-TSA (5) | — | TEOS (4) |
| Comp. Ex. 5 | 46.2 | MeOH (45.8) | FA (2) NMP (1) | 4-HBSA (5) | — | — |
| Comp. Ex. 6 | 46.2 | MeOH (41.8) | FA (2) NMP (1) | 4-HBSA (5) | — | TEOS (4) |

PEDT: Poly ethylene dioxythiophene (Bayer)
MeOH: Methyl alcohol (Aldrich)
FA: Formamide (Aldrich)
PET(aq.): Aqueous solution containing poly ethylene terephthalate (solid content of poly ethylene terephthalate) = 20%) (SKC)
NMP: N-methylpyrrolidone (Aldrich)
A-187: (γ-Glycide oxypropyl)trimethoxy silane (Degussa)
p-TSA: p-Toluene sulfonic acid (Aldrich)
Melamine resin: Aldrich (solid content = 90%)
TEOS: Tetraethoxy silane (Aldrich)

[Property Evaluation]

(5) Liquid stability was evaluated depending on presence of the aggregation after a week's storage at room temperature.

TABLE 2

| Properties | Conductivity ($\Omega/m^2$) | Transparency (%) | Waterproof property | Adhesiveness | Homogeneity | Liquid stability |
|---|---|---|---|---|---|---|
| Ex. 1 | 380 | 96 | Good | Good | Good | Good |
| Ex. 2 | 400 | 96 | Good | Good | Good | Good |
| Ex. 3 | 440 | 95 | Good | Good | Good | Good |
| Comp. Ex. 1 | 350 | 96 | Poor | Good | Good | Good |
| Comp. Ex. 2 | 480 | 95 | Poor | Good | Good | Good |
| Comp. | 650 | 94 | Poor | Poor | Poor | Poor |

TABLE 2-continued

| Properties | Conductivity (Ω/m²) | Transparency (%) | Waterproof property | Adhesiveness | Homogeneity | Liquid stability |
|---|---|---|---|---|---|---|
| Ex. 3 |  |  |  |  |  |  |
| Comp. Ex. 4 | 850 | 94 | Poor | Good | Poor | Poor |
| Comp. Ex. 5 | 900 | 94 | Poor | Poor | Poor | Poor |
| Comp. Ex. 6 | 900 | 94 | Poor | Good | Poor | Poor |

As shown in Table 2, as compared to Comparative Examples 1-6, where a stabilizer was used without using a melamine resin, Examples 1-3, where a melamine resin component was used according to the present invention, showed an improvement in both the conductivity and the transparency as well as in the adhesiveness, membrane Homogeneity, liquid stability and, in particular, the waterproof property.

Examples 4-8 and Comparative Examples 7-9

Amide-Based Organic Solvent

A mixed solution composition was prepared as described in Example 1 by using the ingredients shown in Table 3.

The mixed solution composition was coated onto a transparent substrate, dried in an oven (125° C.) for about 5 minutes, and produced a polythiophene polymer membrane. The thickness of the dried membrane was less than 5 μm. The properties of thus prepared polythiophene polymer membrane were measured as described below, and the results are presented in Table 4.

TABLE 3

| Content (g) | PEDT aqueous solution | Alcohol | Amide-based solvent | Melamine resin | Binder Polyester/ urethane/ alkoxy silane |
|---|---|---|---|---|---|
| Ex. 4 | 26 | MeOH (68.1) | FA (2) NMP (1) | Melamine (2) | PET(aq) (0.9) |
| Ex. 5 | 26 | EtOH (69.1) | FA (2) NMP (1) | Melamine (1) | R-986 (0.9) |
| Ex. 6 | 26 | MeOH (61.1) | FA (2) NMP (1) NMAA (4) | Melamine (5) | A-187 (0.9) |
| Ex. 7 | 46.2 | MeOH (42.8) | FA (2) NMP (1) | Melamine (5) | A-187 (3) |
| Ex. 8 | 65 | MeOH (24) | FA (2) NMP (1) | Melamine (8) | — |
| Comp. Ex. 7 | 46.2 | EtOH (50.8) | FA (2) NMP (1) | — | PET(aq) (2) |
| Comp. Ex. 8 | 46.2 | EtOH (47.9) | FA (2) NMP (1) | — | TEOS (0.9) PET(aq) (2) |
| Comp. Ex. 9 | 46.2 | EtOH (47.9) | FA (2) NMP (1) | — | A-187 (0.9) |

PEDT: Poly ethylene dioxythiophene (Bayer)
MeOH: Methyl alcohol (Aldrich)
FA: Formamide (Aldrich)
PET(aq.): Aqueous solution containing poly(ethylene terephthalate) (solid content of poly ethylene terephthalate) = 20%) (SKC)
NMP: N-methylpyrrolidone (Aldrich)
A-187: (γ-Glycide oxypropyl)trimethoxy silane (Degussa)
R-986: Aqueous solution containing polyurethane (solid content of polyurethane = 25%) (DMS)
Melamine resin: Aldrich (solid content = 90%)
TEOS: Tetraethoxy silane (Aldrich)

TABLE 4

| Properties | Conductivity (Ω/m²) | Transparency (%) | Waterproof property | Adhesiveness | Homogeneity | Liquid stability |
|---|---|---|---|---|---|---|
| Ex. 4 | 710 | 98 | Good | Good | Good | Good |
| Ex. 5 | 770 | 97 | Good | Good | Good | Good |
| Ex. 6 | 780 | 97 | Good | Good | Good | Good |
| Ex. 7 | 370 | 96 | Good | Good | Good | Good |
| Ex. 8 | 290 | 96 | Good | Good | Good | Good |
| Comp. Ex. 7 | 368 | 97 | Poor | Poor | Good | Good |
| Comp. Ex. 8 | 405 | 96 | Poor | Good | Poor | Good |
| Comp. Ex. 9 | 420 | 94 | Poor | Good | Good | Good |

As shown in Table 4, Examples 4-8 showed an improvement in both the conductivity and the transparency as well as in the adhesiveness, membrane Homogeneity, a liquid stability and, in particular, the waterproof property as compared to Comparative Example 7, where a melamine resin and a binder were not used, as well as Comparative Examples 8-9, where a melamine resin was not used.

Examples 9-12 and Comparative Examples 10-12

Aprotic Highly-Dipolar Solvent

A mixed solution composition was prepared as described in Example 1 by using the ingredients shown in Table 5.

The mixed solution composition was coated onto a transparent substrate, dried in an oven (125° C.) for about 5 minutes, and produced a polythiophene polymer membrane. The thickness of the dried membrane was less than 5 μm. The properties of thus prepared polythiophene polymer membrane were measured as described below, and the results are presented in Table 6.

TABLE 5

| Content (g) | PEDT aqueous solution | Alcohol | Aprotic highly-dipolar solvent | Dispersion stabilizer | Melamine resin | Binder Polyester/ urethane/ alkoxy silane |
|---|---|---|---|---|---|---|
| Ex. 9 | 26 | MeOH (62) | DMSO (4) | EG (6) | Melamine (1) | PET(aq) (1) |
| Ex. 10 | 50 | MeOH (37) | DMSO (4) | EG (6) | Melamine (1) | R-986 (2) |
| Ex. 11 | 50 | MeOH (38) | DMSO (4) | EG (6) | Melamine (1) | A-187 (1) |
| Ex. 12 | 60 | MeOH (27) | DMSO (4) | EG (6) | Melamine (1) | A-187 (2) |
| Comp. Ex. 10 | 50 | MeOH (30) | DMSO (10) | EG (10) | — | — |
| Comp. Ex. 11 | 20 | MeOH (59) | DMSO (10) NMFA (1) | EG (10) | — | — |
| Comp. Ex. 12 | 50 | MeOH (22) | DMSO (10) | EG (10) | — | PET(aq) (2) TEOS (6) |

PEDT: Poly ethylene dioxythiophene (Bayer)
MeOH: Methyl alcohol (Aldrich)
FA: Formamide (Aldrich)
NMFA: N-methyl formamide (Aldrich)
EG: Ethylene glycol (Aldrich)
PET(aq.): Aqueous solution containing poly ethylene terephthalate (solid content of poly ethylene terephthalate = 20%) (SKC)
NMP: N-methylpyrrolidone (Aldrich)
DMSO: Dimethyl sulfoxide (Aldrich)
A-187: (γ-Glycide oxypropyl)trimethoxy silane (Degussa)
R-986: Aqueous solution containing polyurethane (solid content of polyurethane = 25%) (DMS)
Melamine resin: Aldrich (solid content = 90%)
TEOS: Tetraethoxy silane (Aldrich)

TABLE 6

| Properties | Conductivity ($\Omega/m^2$) | Transparency (%) | Waterproof property | Adhesiveness | Homogeneity | Liquid stability |
|---|---|---|---|---|---|---|
| Ex. 9 | 980 | 99 | Good | Good | Good | Good |
| Ex. 10 | 350 | 97 | Good | Good | Good | Good |
| Ex. 11 | 310 | 95 | Good | Good | Good | Good |
| Ex. 12 | 250 | 95 | Good | Good | Good | Good |
| Comp. Ex. 10 | 348 | 97 | Poor | Poor | Good | Good |
| Comp. Ex. 11 | 320 | 97 | Poor | Poor | Good | Poor |
| Comp. Ex. 12 | 405 | 95 | Poor | Good | Poor | Good |

As shown in Table 6, Examples 9-12 showed an improvement in both the conductivity and the transparency as well as in the adhesiveness, membrane Homogeneity, a liquid stability and, in particular, the waterproof property as compared to Comparative Examples 10-11, where a melamine resin and a binder were not used, as well as Comparative Example 12, where a melamine resin was not used.

DETAILED DESCRIPTION OF INVENTION

In an embodiment, the present invention relates to a polythiophene-based conductive polymer composition comprising 1) an aqueous solution of a polythiophene-based conductive polymer, 2) an alcohol-based organic solvent, 3) an amide-based organic solvent, and 4) a melamine resin.

In another embodiment, the present invention relates to a polythiophene-based conductive polymer composition comprising 1) an aqueous solution of a polythiophene-based conductive polymer, 2) an alcohol-based organic solvent, 3) an amide-based organic solvent, 4) a melamine resin, and 5) a binder selected from the group consisting of a polyester, a polyurethane and an alkoxy silane.

In a further embodiment, the present invention relates to a polythiophene-based conductive polymer composition comprising 1) an aqueous solution of a polythiophene-based conductive polymer, 2) an alcohol-based organic solvent, 3) an aprotic highly-dipolar solvent, and 4) a melamine resin.

In a still further embodiment, the present invention relates to a polythiophene-based conductive polymer composition comprising 1) an aqueous solution of a polythiophene-based conductive polymer, 2) an alcohol-based organic solvent, 3) an aprotic highly-dipolar solvent, 4) a melamine resin, and 5) a binder selected from the group consisting of a polyester, a polyurethane and an alkoxy silane.

Hereunder is provided a detailed description of the present invention.

The present invention relates to a polythiophene-based conductive polymer composition comprising an aqueous solution of a polythiophene-based conductive polymer, an alcohol-based organic solvent, an amide-based organic solvent or an aprotic highly-dipolar solvent, a melamine resin, and a binder selected from the group consisting of a polyester, a polyurethane and an alkoxy silane.

Specifically, the present invention relates to a polythiophene-based conductive polymer composition, which comprises:

an amide-based organic solvent or an aprotic highly-dipolar solvent which partially dissolves a polymer portion in an aqueous solution of a polythiophene-based conductive polymer, thus increasing the connection between the polythiophene-based conductive polymers and the dispersion property;

a melamine resin, $NH^+$ group of which binds with the $SO_3^-$ group in an aqueous solution of a polythiophene-based conductive polymer (Baytron P), thus increasing waterproof property and time-dependent electrical stability by preventing the $SO_3^-$ group from binding with water; and a binder selected from the group consisting of a polyester, a polyurethane and an alkoxy silane, which increases the adhesiveness with the transparent substrate and the durability of the conductive membrane.

This polythiophene-based conductive polymer solution improves both conductivity and transparency as well as other properties such as waterproof property, adhesiveness, durability, membrane Homogeneity and liquid stability without using the conventional stabilizer of a sulfonic acid group for connecting polythiophene-based conductive polymer.

A membrane or layer, which shows both the conductivity of less than 1 k$\Omega$/m$^2$, preferably in the range of from 100 $\Omega$/m$^2$ to 1 k$\Omega$/m$^2$ and the transparency of 95%, preferably 95-99%, as well as other properties such as waterproof property, adhesiveness, durability, membrane Homogeneity and liquid stability, may be obtained by coating a polythiophene-based conductive polymer solution composition according to the present invention onto transparent substrate such as glass or synthetic resin film. The conductivity of less than 1 k$\Omega$/m$^2$ is very high value that satisfies TCO (Tianstemanners Central Organization) enacted by laborer conference in Sweden, where the standard regarding the prevention of electromagnetic waves is the most tight.

Hereunder is provided a detailed description of the each ingredient of a polythiophene-based conductive polymer composition herein.

First, although any polymer used in the art the present invention pertains to may be used as a polythiophene-based conductive polymer herein, polyethylene dioxythiophene (PEDT, specifically Baytron P purchased from Bayer) is used in the present invention. P EDT is doped with polystyrene sulfonate (PSS) as a stabilizer (dopant), and show superior solubility in water, thermal stability and weatherability. Further, the content of solid (PEDT and PSS) is controlled to be in the range of 1.0-1.5 wt % for optimizing the dispersion property. PEDT is well miscible with water, alcohol or a solvent with high dielectric constant, and may be easily coated with a coating material diluted with this kind of solvent. Further, the coated membrane shows superior transparency as compared to other conductive polymers such as polyaniline and polypyrrole.

An aqueous solution of a polythiophene-based conductive polymer is used in an amount of 20-70 wt %, preferably 26-67 wt %. If the amount is less than 20 wt %, high conductivity of less than 1 k$\Omega$/m$^2$ may not be achieved, although an amide-based organic solvent and an aprotic highly-dipolar (AHD) solvent is used in a large amount. If the amount is higher than 70 wt %, transparency may decrease down to less than 95%, in particular at a longer wavelength (higher than 550 nm) due to the increase in the amount of colored conductive polymer.

As an alcohol-based organic solvent, $C_1$-$C_4$ alcohols, such as methanol, ethanol, propanol, isopropanol and butanol, may be used alone or in combination. In particular, methanol is preferred to be used as a main solvent to increase dispersion property of PEDT conductive polymer.

An alcohol may be used in an amount of 10-75 wt %, preferably 10-71 wt %, more preferably 24-70 wt %, when used in combination with an amide-based organic solvent. When used in combination with an aprotic highly-dipolar solvent, an alcohol may be used in an amount of 5-68 wt %, more preferably 20-62 wt %. If the amount is less than 10 wt %, high dispersion property of the coated membrane may not achieved although high conductivity may be obtained. If the amount is higher than 75 wt %, conductivity may be decrease and aggregation may be easily formed.

As an amide-based organic solvent, formamide (FA), N-methylformamide (NMFA), N,N-dimethylformamide (DMF), acetamide (AA), N-methylacetamide (NMAA), N-dimethylacetamide (DMA) or N-methylpyrrolidone (NMP) is preferred to be used. These amide-based organic solvents have intramolecular amide group [$R_1$(CO)$NR_2R_3$] (wherein R is H, $CH_3$ or —$CH_2CH_2CH_2$—) in common. Although a single amide-based solvent may increase the conductivity of PEDT conductive polymer, a combinational use of more than two amide-based organic solvents is preferred to achieve a surface resistance of less than 1 k$\Omega$/m$^2$ and a transparency of higher than 95%. Although the mixed ratio of the solvents may be appropriately determined, a preferable mixed ratio is 2:1.

Further, as an aprotic highly-dipolar solvent (AHD), dimethyl sulfoxide (DMSO) or propylene carbonate (Propylene carbonate) may be used. The aprotic highly-dipolar solvent (AHD) and the amide-based solvent is preferred to be used separately. The mixture is not preferred because it may only slightly increase the conductivity, and may not allow achieving high transparency and a long-term liquid stability.

High increase in conductivity may not be achieved by using an aprotic highly-dipolar solvent (AHD) alone. For increasing conductivity, a dispersion stabilizer, such as ethylene glycol (EG), glycerin and sorbitol, is preferred to be used. A dispersion stabilizer is preferred to be used in an amount of 1-10 wt %, preferably 4-10 wt %, relative to the amount of polythiophene-based conductive polymer solution composition. If the amount is less than 4 wt %, high conductivity may not be achieved. If the amount is higher than 10 wt %, high-temperature plasticization is required due to high boiling point, although high conductivity may be obtained.

An amide-based organic solvent is preferred to use in an amount of 1-10 wt %, preferably 3-7 wt %, and an aprotic highly-dipolar solvent is used in an amount of 1-10 wt %, preferably 4-8 wt %. If the amount is less than the aforementioned lower value, high conductivity may not be achieved. If the amount is higher than the aforementioned higher value, high-temperature plasticization may be necessary due to the increase in the portion of an amide-based solvent having high boiling temperature, although high conductivity may be achieved. High-temperature plasticization may decrease conductivity of PEDT conductive polymer and cause the deformation of substrate when only plastic with no glass is used as a substrate.

PEDT conductive polymer solution herein comprises a water-soluble or alcohol-soluble polymer resin as a binder for increasing waterproof property, substrate adhesiveness and durability. A resin in an aqueous solution state is preferred because PEDT conductive polymer solution is an aqueous dispersion. However, the waterproof property may be poor because PEDT conductive polymer solution itself is an aqueous dispersion and the $SO_3^-$ group in the solution easily binds with water as well due to the use of a binder in an aqueous solution state for increasing adhesiveness. Thus, a melamine resin is used in the present invention as an essential ingredient for securing high waterproof property. This melamine resin may increase both waterproof property and time-dependent electrical stability because the $NH^+$ group in a melamine resin binds with the $SO_3^-$ group in an aqueous solution of a polythiophene-based conductive polymer (Baytron P), thus preventing the $SO_3^-$ group from binding with water.

A melamine resin may be used in an amount of 1-10 wt %, preferably 1-8 wt %. If the amount is less than 1 wt %, the waterproof property of a conductive membrane may be poor. If the amount is higher than 10 wt %, there may be a limitation in increasing the conductivity although the waterproof property may be remarkably increased.

A binder, which increases the adhesiveness with the transparent substrate and the durability, may be selected among a polyester, a polyurethane resin and an alkoxy silane. For achieving higher adhesiveness, the aforementioned binders may used in combination. Particularly, a polyester resin is preferred to be used to increase the adhesiveness with the substrate when conducting a coating procedure onto a poly ethylene terephthalate film.

A binder may be used in an amount of 0.1-5 wt %, preferably 0.5-4 wt %. If the amount is less than 0.1 wt %, the adhesiveness with the substrate and the durability of the conductive membrane may be poor. If the amount is higher than 5 wt %, there may be a limitation in increasing the conductivity.

Besides, an additive for lowering viscosity and improving slipping property may additionally added in an amount of 0.05-5 wt % to prevent the blocking property (or to increase the slipping property) of the coated surface.

Meanwhile, a polythiophene conductive polymer solution composition herein having high conductivity, transparency, waterproof property and durability may be prepared by using the conventional method. Usable method may be divided into two groups; one is conducted by using an amide solvent and a melamine resin without additional dopant, and the other is conducted by using an aprotic highly-dipolar solvent (AHD) solvent and a melamine resin without using additional dopant.

Thus prepared solution composition may be coated onto the glass surface of a Braun tube (TV, computer) or a transparent substrate of a casting polypropylene (CPP) film, a polyethylene terephthalate (PET) film and a polycarbonate and acrylic panel. This is dried in an oven (100-145° C.) for about 1-10 minutes, thus providing polythiophene polymer membrane having transparency and conductivity, which may be used for preventing electromagnetic waves or preparing electrodes. The coating process may be conducted according to a bar coating, a roll coating, a flow coating, a dip coating or a spin coating. The thickness of the coated layer is less than 5 µm.

Thus prepared anti-static polymer membrane satisfies the TCO standards regarding the prevention of electromagnetic waves, and may be applied to transparent electrode film such as an upper or lower electrode film for touch panel and a film for inorganic EL electrode, which requires high conductivity, transparency, waterproof property and durability.

INDUSTRIAL APPLICABILITY

As mentioned above, polymer membrane prepared by using polythiophene-based conductive polymer solution composition of the present invention may be applied to a film for higher or lower electrode in touch panel, a transparent electrode film for display such as a film for an inorganic EL electrode, the surface of TV Braun tube and a screening layer in a computer monitor for preventing electromagnetic waves, which requires conductivity of less than 1 $k\Omega/m^2$, transparency of higher than 95%, high waterproof property and adhesiveness, as well as to other glass, polycarbonate acrylic plate, poly ethylene terephthalate or casting polypropylene (CPP) film.

The invention claimed is:

1. A polythiophene-based conductive polymer composition, which comprises:
   (i) 20-70 wt % of an aqueous solution of a polythiophene-based conductive polymer;
   (ii) 10-75 wt % of an alcohol-based organic solvent;
   (iii) 1-10 wt % of an amide-based organic solvent; and
   (iv) 1-10 wt % of a melamine resin.

2. A conductive polymer membrane, which is prepared by coating the composition of claim 1 onto a substrate.

3. A conductive polymer membrane of claim 2;
   wherein the conductive polymer membrane is utilized for the preparation of an anti-static film, a film for touch panel, a film for higher or lower electrode, a film for inorganic EL and a film for display electrode.

4. A polythiophene-based conductive polymer composition, which comprises:
   (i) 20-70 wt % of an aqueous solution of a polythiophene-based conductive polymer;
   (ii) 10-75 wt % of an alcohol-based organic solvent;
   (iiii) 1-10 wt % of an amide-based organic solvent;
   (iv) 1-10 wt % of a melamine resin; and
   (v) a binder selected from the group consisting of a polyester, a polyurethane and an alkoxy silane 0.1-5 wt %.

5. The polythiophene-based conductive polymer composition of claim 4;
   wherein the alcohol-based organic solvent is a $C_1$-$C_4$ alcohol, and the amide based organic solvent is selected from the group consisting of formamide, NMP, NMFA, NMAA, DMF, DMA, AA, and mixtures thereof, and the composition does not contain any stabilizer.

6. A polythiophene-based conductive polymer composition, which comprises:
   (i) 20-70 wt % of an aqueous solution of a polythiophene-based conductive polymer;
   (ii) 10-75 wt % of an alcohol-based organic solvent;
   (iiii) 1-10 wt % of an aprotic highly-dipolar solvent; and
   (iv) 1-10 wt % of a melamine resin.

7. The polythiophene-based conductive polymer composition of claim 6, which further comprises:
   a dispersion stabilizer selected from the group consisting of an ethylene glycol, a glycerin and a sorbitol.

8. The polythiophene-based conductive polymer composition of claim 7;
   wherein the dispersion stabilizer is comprised in the amount of 1-10 wt %.

9. The polythiophene-based conductive polymer composition of claim 6;
   wherein the aprotic highly-dipolar solvent is a poly(propylene carbonate) or a dimethyl sulfoxide.

10. A polythiophene-based conductive polymer composition, which comprises:
    (i) 20-70 wt % of an aqueous solution of a polythiophene-based conductive polymer;
    (ii) 10-75 wt % of an alcohol-based organic solvent;
    (iii) 1-10 wt % of an aprotic highly-dipolar solvent;
    (iv) 1-10 wt % of a melamine resin; and
    (v) 0.1-5 wt % of a binder selected from the group consisting of a polyester, a polyurethane and an alkoxy silane.

11. The polythiophene-based conductive polymer composition of claim 10, which further comprises:

a dispersion stabilizer selected from the group consisting of an ethylene glycol, a glycerin and a sorbitol.

12. The polythiophene-based conductive polymer composition of claim 10; wherein the aprotic highly-dipolar solvent is a poly(propylene carbonate) or a dimethyl sulfoxide.

* * * * *